US012627971B2

(12) United States Patent
Delos Reyes et al.

(10) Patent No.: US 12,627,971 B2
(45) Date of Patent: May 12, 2026

(54) SYSTEMS AND METHODS FOR OPTIMIZED DISCOVERY OF A NETWORK DEVICE

(71) Applicant: Verizon Patent and Licensing Inc., Basking Ridge, NJ (US)

(72) Inventors: Emerando M. Delos Reyes, Pleasant Hill, CA (US); Jerry Steben, Fort Worth, TX (US); Maqbool Chauhan, Keller, TX (US); Helen Osias Eglip, Sammamish, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 672 days.

(21) Appl. No.: 18/154,525

(22) Filed: Jan. 13, 2023

(65) Prior Publication Data

US 2024/0244416 A1 Jul. 18, 2024

(51) Int. Cl.
*H04W 4/00* (2018.01)
*H04W 8/00* (2009.01)
*H04W 8/20* (2009.01)

(52) U.S. Cl.
CPC ............. *H04W 8/20* (2013.01); *H04W 8/005* (2013.01)

(58) Field of Classification Search
CPC .......... H04W 8/20; H04W 8/005; H04W 8/00
USPC ........................................ 370/329
See application file for complete search history.

(56) References Cited

U.S. PATENT DOCUMENTS

| | | | | |
|---|---|---|---|---|
| 11,050,788 B2 * | 6/2021 | Livanos | ................ | H04W 48/16 |
| 11,683,775 B1 * | 6/2023 | Mariyani | .............. | H04W 24/04 |
| | | | | 455/435.1 |

| | | | | |
|---|---|---|---|---|
| 11,849,506 B2 * | 12/2023 | Jayaramachar | ......... | H04W 8/20 |
| 11,950,178 B2 * | 4/2024 | Singh | .................... | H04W 24/02 |
| 12,185,205 B2 * | 12/2024 | Sapra | ...................... | H04W 4/50 |
| 2011/0314145 A1 * | 12/2011 | Raleigh | ................... | H04L 63/08 |
| | | | | 709/224 |
| 2012/0215911 A1 * | 8/2012 | Raleigh | ................... | H04W 4/24 |
| | | | | 709/224 |
| 2013/0132854 A1 * | 5/2013 | Raleigh | ................. | G06F 3/0482 |
| | | | | 715/738 |
| 2019/0182749 A1 * | 6/2019 | Breaux | ................ | H04W 4/027 |
| 2020/0036754 A1 * | 1/2020 | Livanos | ................ | H04W 48/16 |
| 2023/0032054 A1 * | 2/2023 | Jayaramachar | ......... | H04W 8/00 |
| 2023/0036465 A1 * | 2/2023 | Mattsson | .............. | H04W 8/005 |
| 2023/0042219 A1 * | 2/2023 | Singh | .................... | H04W 48/16 |
| 2023/0110286 A1 * | 4/2023 | Jayaramachar | ..... | H04L 61/4511 |
| | | | | 370/329 |
| 2023/0188963 A1 * | 6/2023 | Sapra | ...................... | H04W 8/06 |
| | | | | 455/414.1 |
| 2023/0208730 A1 * | 6/2023 | Puente Pestaña | ..... | H04W 24/02 |
| | | | | 709/220 |
| 2023/0224681 A1 * | 7/2023 | Muñoz De La Torre Alonso | ....... | |
| | | | | H04L 12/1407 |
| | | | | 455/406 |
| 2024/0056395 A1 * | 2/2024 | Abdelmalek | ....... | H04L 47/2475 |
| 2024/0121741 A1 * | 4/2024 | Castellanos Zamora | ................... | |
| | | | | H04L 41/40 |

(Continued)

*Primary Examiner* — Marceau Milord

(57) ABSTRACT

In some implementations, a network device may receive a subscription request to subscribe to receive an event notification based on an event. The event may be associated with the network device receiving a request for discovery of a unified data management (UDM) device. The request for discovery of the UDM device may be based on an identifier of a user equipment (UE). The network device may transmit, based on the subscription request, an indication of a subscription to receive the event notification based on the event.

20 Claims, 8 Drawing Sheets

500 ⟶

(56)　　　　　　　References Cited

U.S. PATENT DOCUMENTS

| 2024/0147406 | A1* | 5/2024 | Suh ....................... | H04W 48/18 |
| 2024/0195893 | A1* | 6/2024 | Song ...................... | H04W 8/30 |
| 2024/0372928 | A1* | 11/2024 | Feng .................... | H04W 8/186 |
| 2025/0220604 | A1* | 7/2025 | Udalcovs ............. | H04W 48/16 |
| 2025/0260984 | A1* | 8/2025 | Merino Vazquez .. | H04W 60/04 |

* cited by examiner

First Network Device 105

Second Network Device 110

Subscription request to subscribe to receive an event notification 145

Indication of the subscription 150

100

170
Detect the event based on receiving the request for discovery of the UDM device First Network Device 105

Indication of the event notification based on the event 175

Second Network Device 110

100

400

410 — Receive a subscription request to subscribe to receive an event notification based on an event that is associated with the network device receiving a request for discovery of a unified data management (UDM) device 420 — Transmit, based on the subscription request, an indication of a subscription to receive the event notification based on the event

500

510 Transmit a subscription request to subscribe to receive an event notification based on an event that is associated with a request for discovery of a unified data management (UDM) device 520 Receive, based on the subscription request, an indication of a subscription to receive the event notification based on the event

SYSTEMS AND METHODS FOR OPTIMIZED DISCOVERY OF A NETWORK DEVICE

BACKGROUND

A network device may use a discovery service to discover other network devices and/or to discover services associated with the other network devices. For example, the network device may transmit, to a network repository function (NRF) device, a request for discovery of a data repository device (e.g., a unified data management (UDM) device and/or a unified data repository (UDR) device). The NRF device may perform a lookup operation, based on the request, to obtain identifying information associated with the data repository device (e.g., a UDM group identifier and/or a UDR group identifier). The NRF device may transmit, and the network device may receive, the identifying information. The network device may use the identifying information to retrieve data (e.g., user data and/or subscriber data) from the data repository device.

DETAILED DESCRIPTION OF EXAMPLE EMBODIMENTS

Figure 1A:
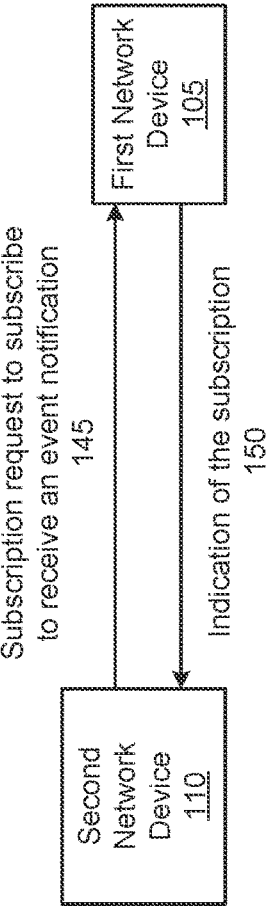
FIGS. 1A-1D are diagrams of an example associated with optimized discovery of a network device.

The following detailed description of example implementations refers to the accompanying drawings. The same reference numbers in different drawings may identify the same or similar elements.

A network device may discover other network devices and/or may discover services associated with the other network devices (e.g., by using requests for discovery of the other network devices). For example, an authentication server function (AUSF) device may transmit a request for discovery of a unified data management (UDM) device to a network repository function (NRF) device (e.g., in association with a session setup procedure and/or a registration procedure). As another example, an access and mobility management function (AMF) device may transmit, to the NRF device, a request for discovery of the UDM device (e.g., in association with a session setup procedure and/or a registration procedure).

The NRF device may perform a subscriber locator function (SLF) request procedure to obtain information associated with the UDM device and/or information associated with a unified data repository (UDR) device that is associated with the UDM device. For example, the request for discovery of the UDM device and/or the UDR device may be based on an identifier of a user equipment (UE) (e.g., a subscription permanent identifier (SUPI) and/or another identifier). The NRF device may obtain the information associated with the UDM device and/or the UDR device based on the identifier of the UE.

For example, the NRF device may transmit, to the SLF device and based on the identifier of the UE, a request for a UDM group identifier associated with the UDM device and/or a UDR group identifier associated with the UDR device that is associated with the UDM device. The NRF device may receive, from the SLF device, the UDM group identifier and/or the UDR group identifier, which are associated with the identifier of the UE. The identifier of the UE may be associated with user profile information and/or subscriber profile information.

The NRF device may transmit, to the AUSF device and/or the AMF device, a discovery response that includes an indication of the group identifier of the UDM device and/or an indication of the group identifier of the UDR device. The AUSF device and/or the AMF device may use the group identifier of the UDM device and/or the group identifier of the UDR device to retrieve information (e.g., to retrieve the user profile information and/or to retrieve the subscriber profile information associated with the identifier of the UE).

However, in some cases, the NRF device may be associated with a large number of discovery requests and/or lookup operations for a session setup procedure and/or a registration procedure (e.g., at least six SLF lookup requests in response that are performed in response to six requests for discovery of the UDM device and/or the UDR device associated with a session setup procedure and/or a registration procedure). For example, in a session setup procedure and/or in a registration procedure (e.g., for a call setup or a packet data unit (PDU) session setup), the AUSF device, the AMF device, an access and mobility (AM)-policy control function (PCF) device, a UE-PCF device, a session management (SM)-PCF, and/or a session management function (SMF) device, among other examples, may each transmit a request for discovery of the UDM device and/or the UDR device.

The NRF may transmit, to the SLF device, N requests for the UDM group identifier associated with the UDM device and/or the UDR group identifier associated with the UDR device that is associated with the UDM device (e.g., in response to N requests for discovery). In other words, although multiple devices request the same information from the NRF device, the NRF device obtains the information on a per-request basis (e.g., by performing an SLF lookup request for each request for discovery transmitted by the multiple network devices). For example, other network devices may transmit requests individually and for each SUPI for UDR device and/or UDM device discovery.

Therefore, the NRF device may consume computing resources, networking resources, processing resources, and/or memory resources, among other examples, associated with obtaining information associated with requests for discovery (e.g., of the UDM device and/or the UDR device). Additionally, network performance may be negatively impacted (e.g., network resources may be consumed and/or latency may be introduced to session setup procedures and/or registration procedures) because the NRF device may perform a large number of transactions to obtain the same information for each of the requests for discovery (e.g., resulting in high NRF device transactions per second (TPS)). Furthermore, the increased latency associated with the session setup procedures and/or the registration procedures may result in an increased likelihood of a session setup timeout or a registration timeout, which may result in a fallback to a less desirable technology (e.g., a technology associated with reduced transfer speeds, reduced data rates, reduced throughput, and/or reduced quality of service (QoS) for the UE, among other examples).

Some implementations described herein provide optimized discovery of a network device (e.g., based on a subscription service associated with a request for discovery of the network device). As an example, a first network device (e.g., a NRF device) may receive, from a second network device (e.g., an access and mobility-policy control function (AM-PCF) device, a UE-PCF device, an SM-PCF device, and/or an SMF device) a subscription request to receive an event notification based on an event. For example, the event may be associated with the first network device receiving a request for discovery of a UDM device, from a third network device (e.g., an AUSF device and/or an AMF device). For example, an NRF device may support tracking requests that the NRF device receives from an AUSF and/or AMF to discover UDM and UDR per SUPI. Additionally, the NRF device may support enabling requests from the AUSF and/or AMF for UDM and UDR discovery per SUPI to be an event that another network function can subscribe to. Other network functions or devices, such as a PCF and/or an SMF, may support providing subscription requests to the NRF for the event (e.g., for any event of AUSF or AMF sending a discovery request to the NRF for UDM and UDR discovery per SUPI). The NRF device may support accepting the subscription request.

The request for discovery of the UDM device may be based on an identifier of a UE (e.g., a SUPI) that is associated with the UDM device. In other words, the event may be associated with an identifier-based request for discovery (e.g., a SUPI-based request for discovery) transmitted from the third network device and received by the first network device. The first network device may transmit, to the second network device and based on the subscription request, an indication of a subscription to receive the event notification based on the event.

As an example, the first network device may transmit, to an SLF device, a request for a UDM group identifier associated with the UDM device and/or a UDR group identifier associated with a UDR device that is associated with the UDM device. The SLF device may perform a lookup procedure to obtain the UDM group identifier and/or the UDR group identifier (e.g., using the identifier of the UE). The first network device may receive, from the SLF device, the UDM group identifier and/or the UDR group identifier. The identifier of the UE may be associated with the UDM group identifier and/or the UDR group identifier.

The first network device may generate a discovery response (e.g., based on the request for discovery of the UDM device) that includes an indication the UDM group identifier associated with the UDM device and/or the UDR group identifier associated with the UDR device that is associated with the UDM device. As an example, the discovery response may be associated with a validity period that indicates a time (e.g., a time period) during which the discovery response is valid (e.g., information associated with the discovery response may be stored (e.g., cached) and used during a time that is within the time indicated by the validity period by the third network device and/or the second network device).

In some implementations, the event notification may be associated with the discovery response (e.g., generated by the first network device). For example, the first network device may generate an indication of the event notification based on information included in the discovery response. In other words, the indication of the event notification may include an indication of the UDM group identifier associated with the UDM device and/or the UDR group identifier associated with the UDR device that is associated with the UDM device (e.g., associated with the identifier of the UE). As an example, the first network device may transmit, to the second network device and based on the subscription, the indication of the event notification. The second network device may store (e.g., cache) the information associated with the indication of the event notification. The second network device may store the information associated with the indication of the event notification for the time indicated by the validity period associated with the discovery response. The second network device may quickly retrieve the information associated with the indication of the event notification to perform an operation (e.g., obtain data from the UDM device using the UDM group identifier and/or obtain data from the UDR device suing the UDR group identifier).

As an example, the second network device may use the stored (e.g., cached) information to determine a UDM device included in the UDM group (e.g., for a session setup procedure and/or a registration procedure), which eliminates a need for an additional discovery request to the first network device. In some implementations, the second network device may store a mapping between the UDR group identifier and individual UDR instances (e.g., of a UDR group associated with the UDR group identifier). As an example, the second network device may use the stored (e.g., cached) information to determine the individual UDR devices in the UDR group (e.g., for a session setup procedure and/or a registration procedure), which eliminates a need for an additional discovery request to the first network device.

In this way, the first network device may transmit information associated with a discovery response (e.g., based on the request for discovery of the UDM device and/or the UDR device), to the second network device based on the subscription (e.g., without receiving a request for discovery of the UDM device and/or the UDR device from the second network device). Furthermore, because the first network device does not receive the request for discovery of the UDM device and/or the UDR device from the second network device, the first network device does not need to perform another lookup operation to obtain the information associated with the discovery response.

For example, in a session setup procedure and/or in a registration procedure, the AM-PCF device, the UE-PCF device, the SM-PCF, and/or the SMF device may each subscribe to receive the event notification based on the event (e.g., the event is associated with the NRF device receiving the request for discovery of a UDM device and/or a UDR device associated with a given UE). For example, the AUSF (e.g., in a registration procedure) and/or the AMF device (e.g., in a session setup procedure) may transmit a request for discovery of the UDM device and/or the UDR device (e.g., associated with a UE) to the NRF device. The NRF may perform a lookup operation (e.g., via a request to the SLF device) to obtain information based on the request for discovery of the UDM device and/or the UDR device.

The NRF device may generate the discovery response based on obtaining the information via the lookup operation. The NRF device may generate the indication of the event notification based on the discovery response. The NRF device may transmit the discovery response to the AUSF device and/or the AMF device (e.g., based on the request for discovery of the UDM device and/or the UDR device) and may transmit the indication of the event notification to the AM-PCF device, the UE-PCF device, the SM-PCF device, and/or the SMF device (e.g., based on the subscription). In this way, the AM-PCF device, the UE-PCF device, the SM-PCF device, and/or the SMF device may receive information associated with the discovery response without transmitting a request for discovery of the UDM device and/or the UDR device, which would otherwise cause the NRF to perform additional lookup operations.

In this way, a quantity of identifier-based lookups associated with the first network device (e.g., an NRF device) during a procedure (e.g., a session setup procedure and/or during a registration procedure, among other examples) is reduced (e.g., by reducing a quantity of requests for discovery of the UDM device and/or the UDR device). As a result, latency is reduced and/or network performance is improved (e.g., in the session setup procedure and/or the registration procedure, among other examples).

Accordingly, some implementations described herein reduce session setup times and/or registration times (e.g., associated with the UE) for a UE, and reduce the likelihood of a session setup timeout and/or a registration timeout occurring, which might otherwise result in a fallback to a less desirable technology. Thus, it would be desirable for the NRF device to provide subscription-based notifications (e.g., as described in more detail herein) associated with discovery responses (e.g., based on requests for discovery of the UDM device and/or the UDR device) rather than providing per-request discovery responses.

FIGS. 1A-1D are diagrams of an example 100 associated with optimized discovery of a network device. As shown in FIGS. 1A-1D, example 100 includes a first network device 105 (e.g., an NRF device), a second network device 110 (e.g., a PCF device and/or an SMF device), a third network device 115 (e.g., an AUSF and/or an AMF), a UDM device 120, a UDR device 125, an SLF device 130, a UE 135, and a radio access network (RAN) 140.

As shown in FIG. 1A, and by reference number 145, the first network device 105 (e.g., an NRF device) may receive, and the second network device 110 (e.g., a PCF device and/or an SMF device) may transmit, a subscription request to subscribe to receive an event notification (e.g., based on an event). For example, the subscription request may include information that identifies the event as being associated with receiving, by the first network device 105, a request for discovery of a UDM device 120 that is transmitted by the third network device 115 (e.g., an AUSF and/or an AMF). For example, if the third network device 115 transmits the request for discovery of the UDM device 120 to the first network device 105, then the event occurs when the first network device 105 receives the request for discovery of the UDM device 120. As another example, the request for discovery of the UDM device 120, transmitted by the third network device 115, may be based on an identifier of a UE 135 (e.g., SUPI associated with the UE 135). In other words, the request for discovery of the UDM device 120 may be a SUPI-based request for discovery of the UDM device 120 that is transmitted from the third network device 115 to the first network device 105.

In some implementations, the subscription request may include information that identifies the event notification as being a notification that includes an indication of a discovery response associated with the request for discovery of the UDM device 120 (e.g., generated and/or transmitted by the first network device 105). Thus, in some implementations, the subscription request may be associated with the second network device 110 requesting to receive, from the first network device 105, a notification that includes information associated with a discovery response that is based on the request for discovery of the UDM device 120 (e.g., received by the first network device 105). For example, the subscription request may be associated with the second network device 110 requesting to receive, from the first network device 105, a notification that includes information associated with a discovery response that is in response to a discovery request transmitted by the third network device 115.

In this way, the second network device 110 may receive information associated with a response to the request for discovery of the UDM device 120, from the first network device 105, without transmitting a request for discovery of the UDM device 120. As a result, the first network device 105 may transmit information associated with the response to the request for discovery of the UDM device 120 without performing a separate lookup operation (e.g., via a request to the SLF device 130) to obtain the information associated with the response to the request for discovery of the UDM device 120. In other words, the first network device 105 may be enabled to provide, to the second network device 110, the information associated with the response to the request for discovery of the UDM device 120 without performing another lookup operation to obtain the information for the second network device 110.

As shown by reference number 150, the first network device 105 may transmit, and the second network device 110 may receive, an indication of the subscription. In some implementations, the first network device 105 may subscribe the second network device 110 to the subscription (e.g., serviced by the first network device 105) based on the subscription request. For example, the first network device 105 may transmit the indication of the subscription to the second network device 110 to confirm that the second network device 110 is subscribed to receive the event notification based on the event. In this way, the second network device 110 may receive the event notification from the first network device 105 based on the event (e.g., the first network device 105 receives the request for discovery of the UDM device 120 and/or the UDR device 125, as described in more detail elsewhere herein).

Figure 1B:
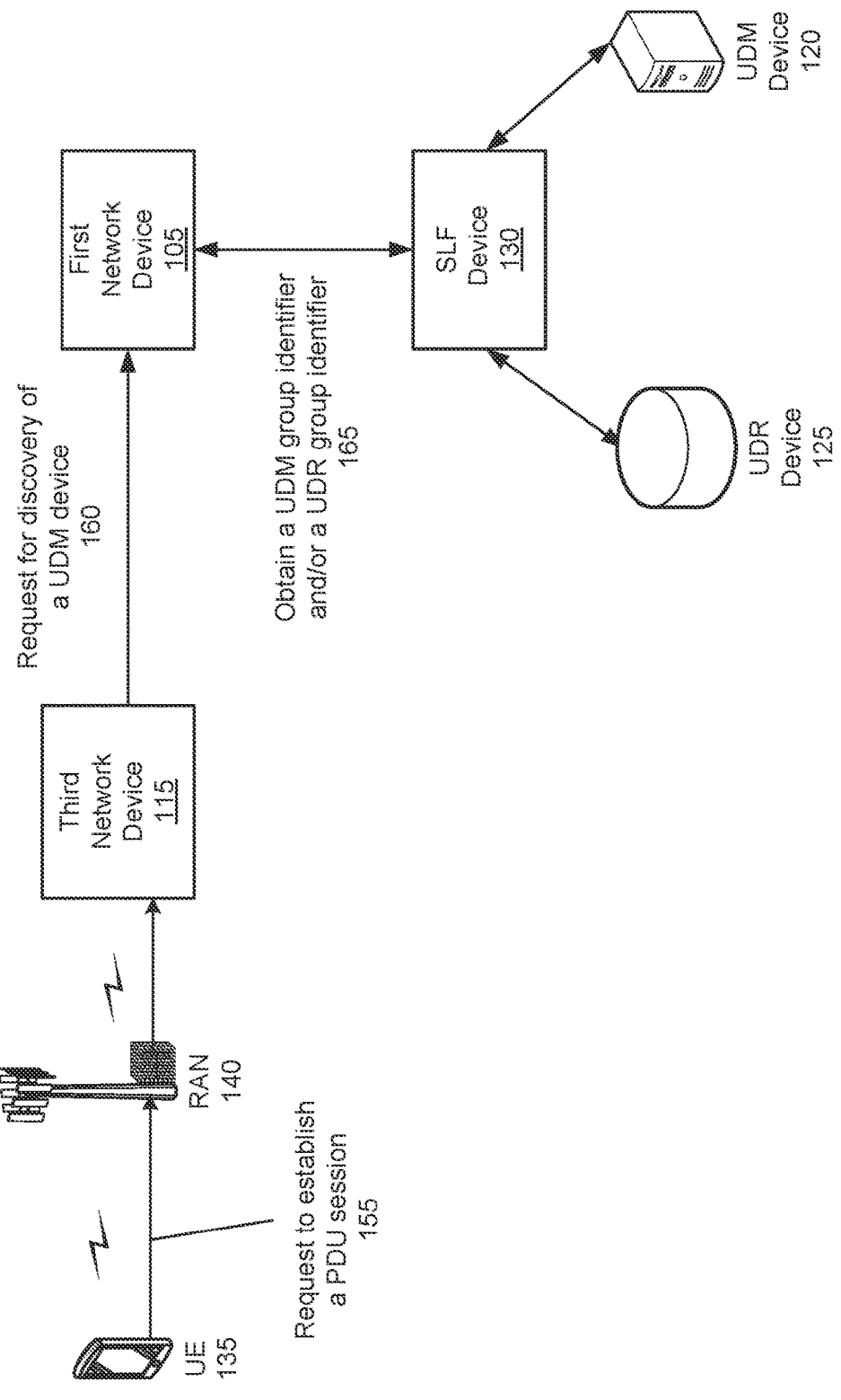

As shown in FIG. 1B, and by reference number 155, the third network device 115 may receive a request to establish a PDU session. For example, the UE 135 may transmit the request to establish the PDU session for the third network device 115 (e.g., the request to establish the PDU session is transmitted to the RAN 140, and the RAN 140 transmits the request to establish the PDU session to the third network device 115). As an example, the UE 135 may request to establish the PDU session to access (e.g., a wireless network) via the RAN 140.

As shown by reference number 160, the first network device 105 may receive, and the third network device 115 may transmit, the request for discovery of a UDM device 120 (e.g., based on an identifier associated with the UE 135). Although the request for discovery of the UDM device 120 as shown and described in connection with FIG. 1B is associated with the request to establish a PDU session, the request for discovery of the UDM device 120 may be associated with a registration procedure and/or a different session setup procedure, among other examples. In other words, the third network deice 115 may transmit the request for discovery of the UDM device 120 for procedures other than a PDU session setup procedure.

As shown by reference number 165, the first network device 105 may obtain a UDM group identifier and/or a UDR group identifier associated with the UDR device 125 that is associated with the UDM device 120 (e.g., based on the identifier of the UE 135). For example, the first network device 105 may transmit, to the SLF device 130, a request for a UDM group identifier and/or a UDR group identifier associated with the UDR device 125 that is associated with the UDM device 120.

As an example, the first network device 105 may query the SLF device 130, using the identifier of the UE 135, to determine the UDM group identifier associated with the UDM device 120. As another example, the first network device 105 may query the SLF device 130, using the identifier of the UE 135, to determine the UDR group identifier associated with the UDR device 125 that is associated with the UDM device 120. In some implementations, the UDM group identifier, the UDR group identifier, and/or the identifier of the UE 135 may be used to obtain information associated with the UE 135 (e.g., a user profile and/or a subscriber profile associated with the UE 135), as described in more detail elsewhere herein. The first network device 105 may receive, from the SLF device 130, the UDM group identifier and/or the UDR group identifier. Although the first network device 105 obtains a UDR group identifier and/or a UDR group identifier as shown and described in connection with FIG. 1B, the first network device 105 may obtain an instance identifier and/or another identifier associated with the UDM device 120 and/or the UDR device 125.

In some implementations, the first network device 105 may generate, in response to receiving the request for discovery of the UDM device 120 from the third network device 115, a discovery response. As an example, the discovery response may include an indication of the UDM group identifier, the UDR group identifier associated with the UDR device that is associated with the UDM device, and/or the identifier of the UE 135, among other examples. The first network device 105 may transmit, and the third network device 115 may receive, an indication of the discovery response (e.g., in response to the request for discovery of the UDM device 120).

Figure 1C:
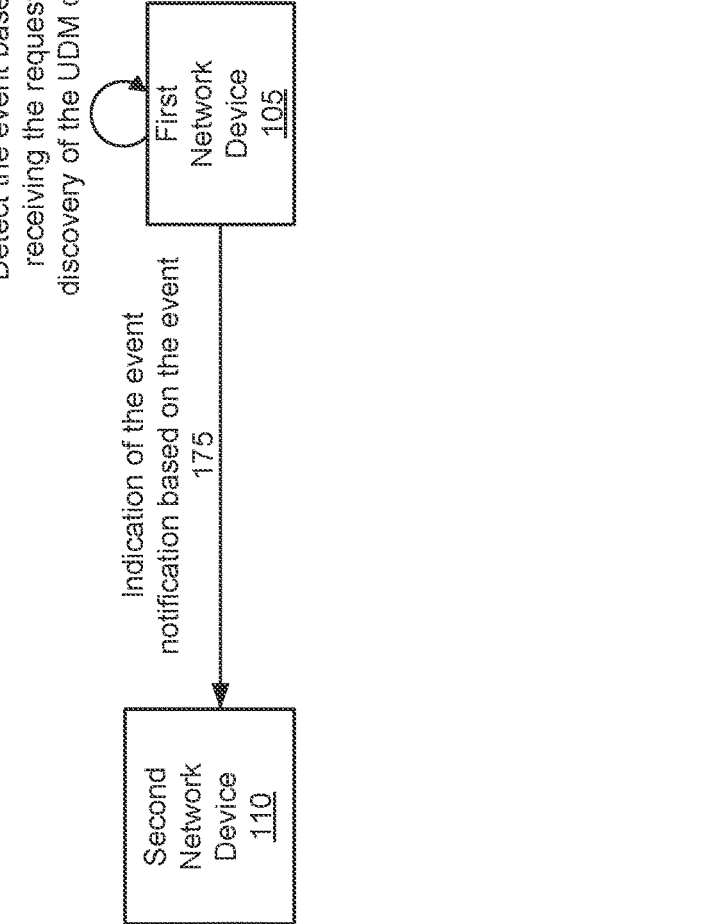

As shown in FIG. 1C, and by reference number 170, the first network device 105 may detect the event based on receiving the request for discovery of the UDM device 120. For example, the first network device 105 may detect the event based on determining that the request for discovery of the UDM device 120 is received from the third network device 115. As another example, the first network device 105 may detect the event based on generating the discovery response. In some implementations, the request for discovery of the UDM device 120 is based on the identifier of the UE 135 (e.g., a SUPI-based request for discovery of the UDM device 120 that is transmitted from the third network device). In some implementations, the first network device 105 may generate an indication of an event notification. For example, the first network device 105 may generate the indication of the event notification in response to generating the discovery response (e.g., the indication of the event notification may include information associated with the discovery response). As an example, the event notification may include information that identifies the UDM group identifier associated with the UDM device 120 and/or the UDR group identifier associated with the UDR device 125 that is associated with the UDM device 120.

As shown by reference number 175, the first network device 105 may transmit, and the second network device 110 may receive, the indication of the event notification. For example, the first network device 105 may transmit, and the second network device 110 may receive, the indication of the event notification based on the subscription (e.g., based on detecting the event). In this way, the second network device 110 may receive the UDM group identifier associated with the UDM device 120 and/or the UDR group identifier associated with the UDR device 125 that is associated with the UDM device 120 without transmitting the request for discovery of the UDM device 120, which would cause the first network device 105 to perform another lookup operation (e.g., via the request to the SLF device 130).

In this way, a quantity of identifier-based lookups associated with the first network device (e.g., an NRF device) during a procedure (e.g., a session setup procedure and/or during a registration procedure, among other examples) is reduced (e.g., by reducing a quantity of requests for discovery of the UDM device and/or the UDR device). As a result, latency is reduced and/or network performance is improved (e.g., in the session setup procedure and/or the registration procedure, among other examples).

In some implementations, the second network device 110 may store (e.g., in a cache associated with the second network device 110) information associated with the indication of the event notification. For example, the second network device 110 may store (e.g., cache) a mapping between the UDM group identifier and individual UDM instances (e.g., of a UDM group associated with the UDM group identifier). As an example, the second network device 110 may use the stored (e.g., cached) information to determine the UDM device 120 (e.g., individual UDM devices 120) in the UDM group (e.g., for a session setup procedure and/or a registration procedure), which eliminates a need for an additional discovery request to the first network device 105. In some implementations, the second network device 110 may store a mapping between the UDR group identifier and individual UDR instances (e.g., of a UDR group associated with the UDR group identifier). As an example, the second network device 110 may use the stored (e.g., cached) information to determine the individual UDR devices 125 in the UDR group (e.g., for a session setup procedure and/or a registration procedure), which eliminates a need for an additional discovery request to the first network device 105.

In some implementations, the second network device 110 may store the information associated with the indication of the event notification for an amount of time (e.g., a time period) that corresponds to the validity period associated with the discovery response. In this way, the second network device 110 may quickly retrieve the information associated with the indication of the event notification (e.g., at a time that is within the time period indicated by the validity period) to perform an operation (e.g., a UDM device 120 and/or a UDR device 125 lookup operation based on receiving the PDU session establishment request). As an example, if the second network device 110 retrieves the information associated with the indication of the event notification at a time that is outside of the time period indicated by the validity period, then the retrieved information may not be accurate.

Figure 1D:
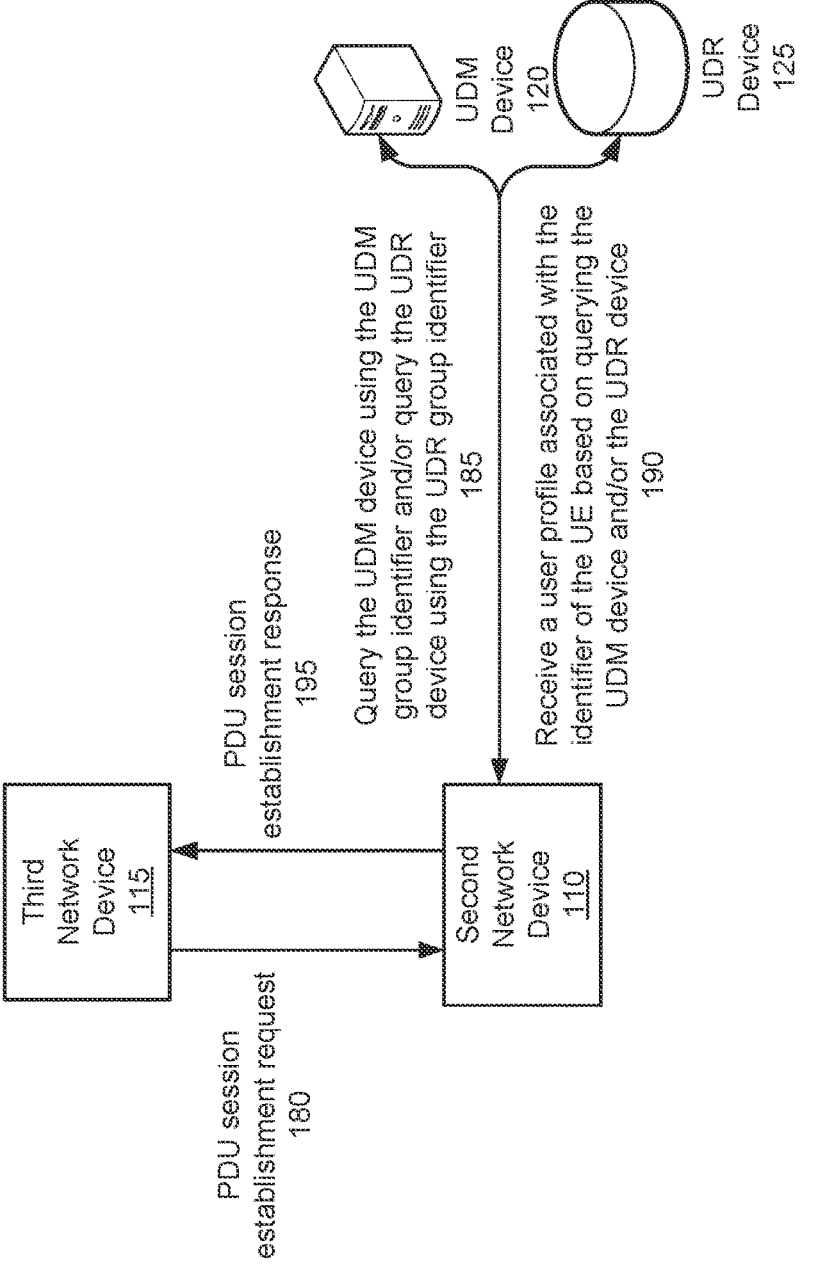

As shown by FIG. 1D, and by reference number 180, the third network device 115 (e.g., an AMF) may transmit, and the second network device 110 may receive, a PDU session establishment request. For example, the third network device 115 may transmit the PDU session establishment request in response to receiving the request to establish the PDU session associated with the UE 135. As an example, the third network device 115 may transmit the PDU session establishment request to the second network device 110 to obtain AM policies (e.g., via communication with an AM-PCF), to obtain UE policies (e.g., via communication with a UE-PCF), and/or to obtain user profile and/or subscriber profile information (e.g., via communication with the UDM device 120 and/or the UDR 125 device). As another example, the third network device 115 may relay or forward messages between the UE 135 and the second network device 110 (e.g., an SMF device, which may obtain SM policies from an SM-PCF and/or may cause the SM-PCF to perform user profile retrieval and/or subscriber profile retrieval via communication with the UDM device 120).

As shown by reference number 185, the second network device 110 may query the UDM device 120 using the UDM group identifier and/or query the UDR device 125 using the UDR group identifier. For example, the second network device 110 query the UDM device 120 (e.g., using the UDM group identifier and/or the identifier of the UE 135 obtained from the first network device 105) to obtain user profile information and/or subscriber profile information (e.g., associated with the UE 135). For example, the second network device 110 may query a storage location (e.g., a cache) using the identifier of the UE 135 to identify the UDM device 120 and/or the UDR device 125 associated with the UE 135 (e.g., without transmitting a discovery request to the first network device 105).

As shown by reference number 190, the second network device 110 may receive, and the UDM device 120 and/or the UDR device 125 may transmit, a user profile (and/or the subscriber profile) associated with the identifier of the UE 135 (e.g., the SUPI). For example, the UDM device 120 and/or the UDR device 125 may obtain the user profile (and/or the subscriber profile) associated with the identifier of the UE 135 in response to the query from the second network device 110.

As shown by reference number 195, the second network device 110 may transmit, and the third network device 115 may receive, a PDU session establishment response. For example, the second network device 110 may provide AM policies (e.g., via an AM-PCF device), may provide UE policies (e.g., via a UE-PCF device), and/or may provide SM policies (e.g., via an SM-PCF device and/or an SMF device), among other examples. As an example, the second network device 110 may transmit, and the third network device may receive the PDU session establishment response to facilitate the PDU session establishment.

In this way, a quantity of identifier-based lookups associated with the first network device (e.g., an NRF device) during a procedure (e.g., a session setup procedure and/or during a registration procedure, among other examples) is reduced (e.g., by reducing a quantity of requests for discovery of the UDM device and/or the UDR device). As a result, latency is reduced and/or network performance is improved (e.g., in the session setup procedure and/or the registration procedure, among other examples).

Accordingly, some implementations described herein reduce session setup times and/or registration times (e.g., associated with the UE) for a UE, and reduce the likelihood of a session setup timeout and/or a registration timeout occurring, which might otherwise result in a fallback to a less desirable technology. Thus, it is desirable for the first network device 105 to provide the subscription-based notifications associated with discovery responses (e.g., based on requests for discovery of the UDM device 120 and/or the UDR device 125) rather than providing per-request discovery responses.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
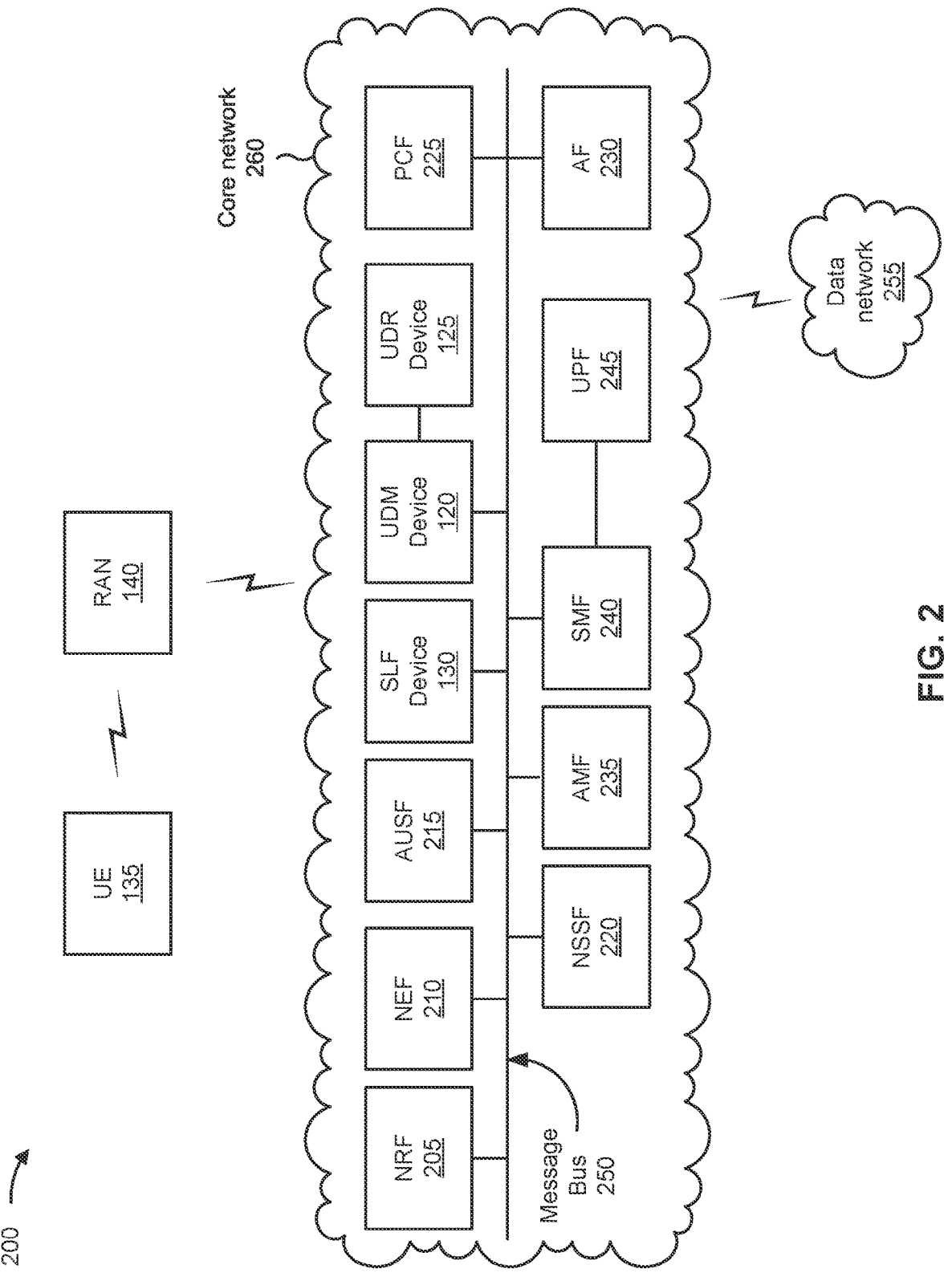
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include the UE 135, the RAN 140, a data network 255, and a core network 260. Devices and/or networks of example environment 200 may interconnect via wired connections, wireless connections, or a combination of wired and wireless connections.

UE 135 includes one or more devices capable of receiving, generating, storing, processing, and/or providing information, such as information described herein. For example, UE 135 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

RAN 140 may support, for example, a cellular radio access technology (RAT). RAN 140 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for UE 135. RAN 140 may transfer traffic between UE 135 (e.g., using a cellular RAT), one or more base stations (e.g., using a wireless interface or a backhaul interface, such as a wired backhaul interface), and/or core network 260. RAN 140 may provide one or more cells that cover geographic areas.

In some implementations, RAN 140 may perform scheduling and/or resource management for UE 135 covered by RAN 140 (e.g., UE 135 covered by a cell provided by RAN 140). In some implementations, RAN 140 may be controlled or coordinated by a network controller, which may perform load balancing, network-level configuration, and/or other operations. The network controller may communicate with RAN 140 via a wireless or wireline backhaul. In some implementations, RAN 140 may include a network controller, a self-organizing network (SON) module or component, or a similar module or component. In other words, RAN 140 may perform network control, scheduling, and/or network management functions (e.g., for uplink, downlink, and/or sidelink communications of UE 135 covered by RAN 140).

In some implementations, core network 260 may include an example functional architecture in which systems and/or methods described herein may be implemented. For example, core network 260 may include an example architecture of a fifth generation (5G) next generation (NG) core network included in a 5G wireless telecommunications system. While the example architecture of core network 260 shown in FIG. 2 may be an example of a service-based architecture, in some implementations, core network 260 may be implemented as a reference-point architecture and/or a 4G core network, among other examples.

As shown in FIG. 2, core network 260 may include a number of functional elements. The functional elements may include, for example, a network repository function (NRF) 205, a network exposure function (NEF) 210, an AUSF 215, a UDM device 120, a UDR device 125, and/or a network slice selection function (NSSF) 220, a PCF 225, an application function (AF) 230, an AMF 235, a session management function (SMF) 240, and/or a user plane function (UPF) 245. For example, the first network device 105, the second network device 110, and/or the third network device 115 may include the NRF 205, the NEF 210, the AUSF 215, the NSSF 220, the UDM device 120, the UDR device 125, the SLF device 130, the PCF 225, the AF 230, the AMF 235, the SMF 240, and/or the UPF 245, among other examples.

As another example, the first network device 105 may be the NRF 205, the second network 110 device may be the PCF 225 and/or the SMF 240, and/or the third network device 115 may be the AUSF 215 and/or the AMF 235. These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The SLF device 130 includes one or more devices that store, maintain, and/or provide subscription information associated with a plurality of user profiles, such as a user profile associated with the UE 135. The subscription information may include an indication of a home subscriber slice (HSS) associated with a user profile, an indication of a UDM device 120 and/or a UDR device 125 to which the user profile is assigned, a UDM profile associated with the user profile, a subscriber profile associated with the user profile, and/or other subscriber information associated with the user profile.

The NRF 205 includes one or more devices that provide a single record of all network functions available in the core network 106, together with a profile of each network function and services supported by each network function. The NRF 205 may allow other network functions to subscribe to, and get notified about, registration in the NRF 205 of new network function instances. In addition to maintaining profiles, the NRF 205 also supports service discovery functions, enabling other network functions to obtain information regarding available network functions that can support specific services.

NEF 210 includes one or more devices that support exposure of capabilities and/or events in the wireless telecommunications system to help other entities in the wireless telecommunications system discover network services.

AUSF 215 includes one or more devices that act as an authentication server and support the process of authenticating UE 135 in the wireless telecommunications system.

UDM device 120 includes one or more devices that store user data and profiles in the wireless telecommunications system. UDM device 120 may be used for fixed access and/or mobile access in core network 260. The user data and profiles may be stored in the UDR device 125, which includes a data repository for storing the user data and profiles.

NSSF 220 includes one or more devices that select network slice instances for UE 135. By providing network slicing, NSSF 220 allows an operator to deploy multiple substantially independent end-to-end networks potentially with the same infrastructure. In some implementations, each slice may be customized for different services.

PCF 225 includes one or more devices that provide a policy framework that incorporates network slicing, roaming, packet processing, and/or mobility management, among other examples.

AF 230 includes one or more devices that support application influence on traffic routing, access to NEF 210, and/or policy control, among other examples.

AMF 235 includes one or more devices that act as a termination point for non-access stratum (NAS) signaling and/or mobility management, among other examples.

SMF 240 includes one or more devices that support the establishment, modification, and release of communication sessions in the wireless telecommunications system. For example, SMF 240 may configure traffic steering policies at UPF 245 and/or may enforce user equipment IP address allocation and policies, among other examples.

UPF 245 includes one or more devices that serve as an anchor point for intra-RAT and/or inter-RAT mobility. UPF 245 may apply rules to packets, such as rules pertaining to packet routing, traffic reporting, and/or handling user plane QoS, among other examples.

Message bus 250 represents a communication structure for communication among the functional elements. In other words, message bus 250 may permit communication between two or more functional elements.

Data network 255 includes one or more wired and/or wireless data networks. For example, data network 255 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
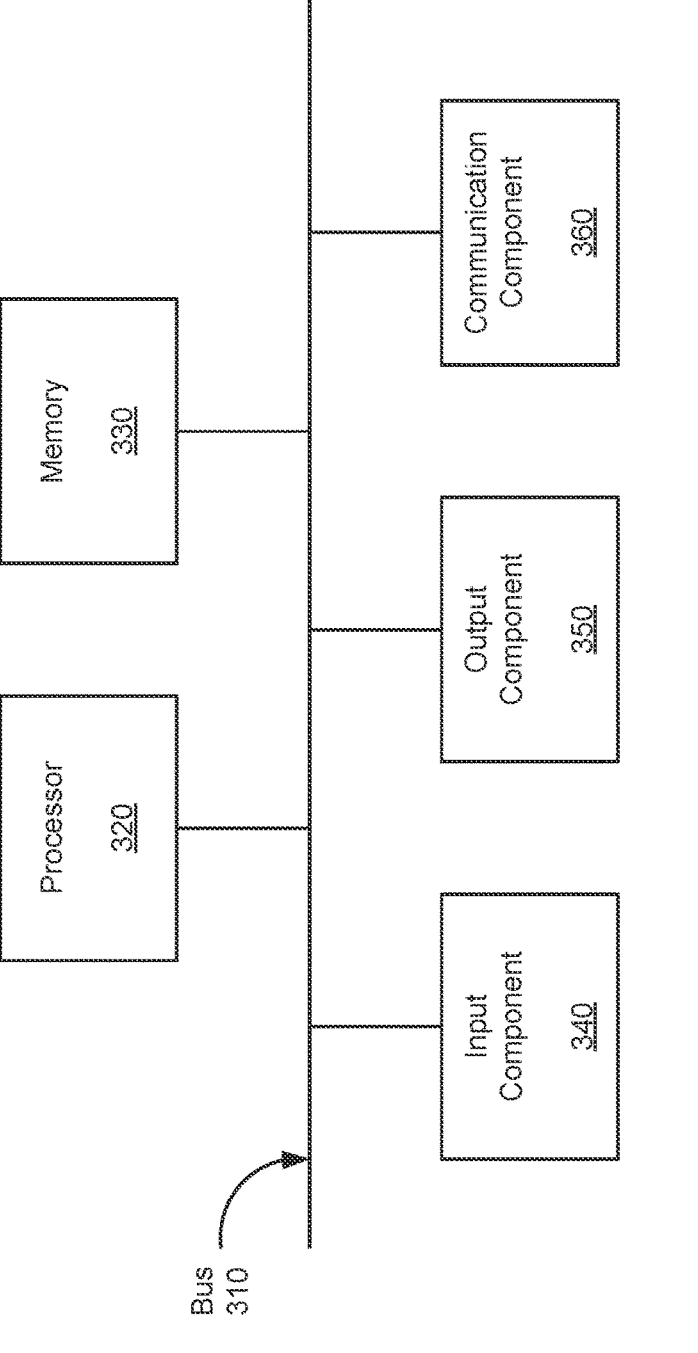
FIG. 3 is a diagram of example components of a device associated with optimized discovery of a network device.

FIG. 3 is a diagram of example components of a device 300 associated with optimized discovery of a network device. The device 300 may correspond to the first network device 105, the second network device 110, the third network device 115, the UDM device 120, the UDR device 125, the SLF device 130, the NRF 205, the NEF 210, the AUSF 215, the NSSF 220, the PCF 225, the AF 230, the AMF 235, the SMF 240, and/or the UPF 245. In some implementations, the first network device 105, the second network device 110, the third network device 115, the UDM device 120, the UDR device 125, the SLF device 130, the NRF 205, the NEF 210, the AUSF 215, the NSSF 220, the PCF 225, the AF 230, the AMF 235, the SMF 240, and/or the UPF 245 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
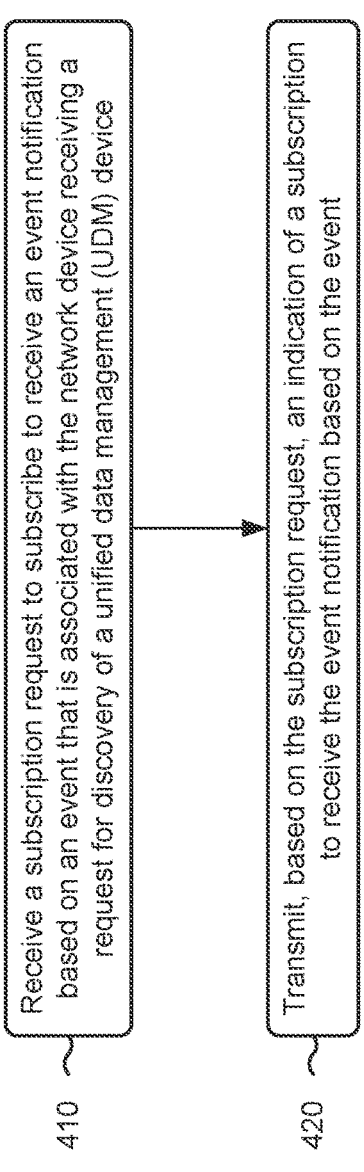
FIG. 4 is a flowchart of an example process associated with optimized discovery of a network device.

FIG. 4 is a flowchart of an example process 400 associated with optimized discovery of a network device. In some implementations, one or more process blocks of FIG. 4 may be performed by a network device (e.g., first network device 105, such as an NRF device). In some implementations, one or more process blocks of FIG. 4 may be performed by another device or a group of devices separate from or including the network device, such as a second network device (e.g., second network device 110), and/or a third network device (e.g., third network device 115). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving a subscription request to subscribe to receive an event notification based on an event (block 410). For example, the network device (e.g., the first network device 105) may receive a subscription request to subscribe to receive an event notification based on an event. As an example, the event may be associated with the network device receiving a request for discovery of a UDM device. The request for discovery of the UDM device may be based on an identifier of a UE, as described above. For example, the event may be associated with the network device receiving the request for discovery of the UDM device from an AUSF device and/or an AMF device. As another example, the network device may receive, the subscription request from the PCF device and/or the SMF device.

As further shown in FIG. 4, process 400 may include transmitting, based on the subscription request, an indication of a subscription to receive the event notification based on the event (block 420). For example, the network device may transmit, based on the subscription request, an indication of a subscription to receive the event notification based on the event, as described above.

For example, the network device may transmit, based on the subscription, an indication of the event notification. The indication of the event notification may include an indication of at least one of a UDM group identifier associated with the UDM device, or a UDR group identifier associated with a UDR device that is associated with the UDM device. The identifier of the UE may be associated with the UDM group identifier and the UDR group identifier.

As an example, the network device may transmit the indication of the event notification to a PCF device and/or or an SMF device. As another example, the network device may transmit, to an SLF device, a request for the UDM group identifier and the UDR group identifier associated with the UDR device that is associated with the UDM device. As an example, the network device may receive, from the SLF device, the UDM group identifier and/or the UDR group identifier. The identifier of the UE may be associated with the UDM group identifier and the UDR group identifier.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
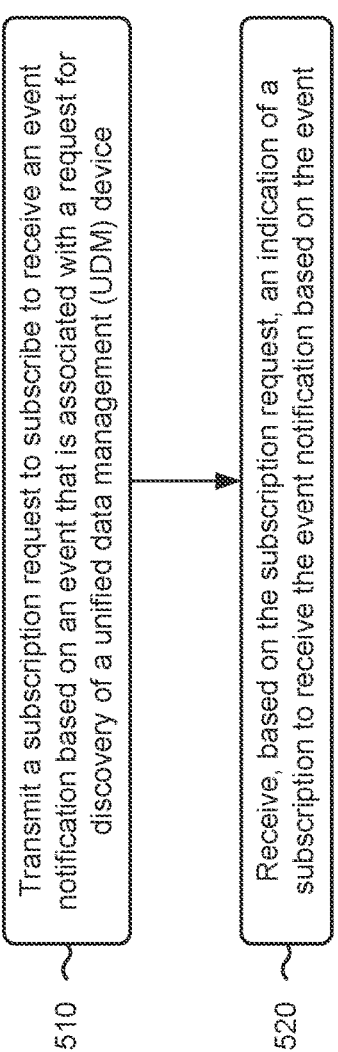
FIG. 5 is a flowchart of an example process associated with optimized discovery of a network device.

FIG. 5 is a flowchart of an example process 500 associated with optimized discovery of a network device. In some implementations, one or more process blocks of FIG. 5 may be performed by a network device (e.g., the second network device 110, such as the PCF 225 and/or the SMF 240). In some implementations, one or more process blocks of FIG. 5 may be performed by another device or a group of devices separate from or including the network device, such as a first network device (e.g., first network device 105), and/or a third network device (e.g., third network device 115), among other examples. Additionally, or alternatively, one or more process blocks of FIG. 5 may be performed by one or more components of device 300, such as processor 320, memory 330, input component 340, output component 350, and/or communication component 360.

As shown in FIG. 5, process 500 may include transmitting a subscription request to subscribe to receive an event notification based on an event (block 510). For example, the network device may transmit a subscription request to subscribe to receive an event notification based on an event. As an example, the event may be associated with a request for discovery of a UDM device. The request for discovery of the UDM device may be based on an identifier of a UE, as described above.

As further shown in FIG. 5, process 500 may include receiving, based on the subscription request, an indication of a subscription to receive the event notification based on the event (block 520). For example, the network device may receive, based on the subscription request, an indication of a subscription to receive the event notification based on the event, as described above.

In some implementations, the network device may receive, based on the subscription, an indication of the event notification. The event notification may include an indication of a UDM group identifier associated with the UDM device, and a UDR group identifier associated with a UDR device that is associated with the UDM device. The identifier of the UE may be associated with the UDM group identifier and/or the UDR group identifier.

In some implementations, the network device may receive a PDU session establishment request. As an example, the network device may query, using the UDM group identifier and/or the UDR group identifier, the UDM device and/or the UDR device based on receiving the PDU session establishment request. The network device may receive, based on querying the UDM device and/or the UDR device, a user profile and/or a subscriber profile associated with the identifier of the UE. As an example, the UDM group identifier and the UDR group identifier may be associated with a validity period, as described above.

For example, the network device may transmit, to an NRF device, the subscription request. In some implementations, the network device may be a PCF and/or an SMF device.

As an example, the request for discovery the UDM device may be based on a transmission from an AUSF device request for discovery and/or an AMF device request for discovery.

In some implementations, the network device may receive, based on the subscription, the indication of the event notification. As an example, the indication of the event notification may be a discovery response (e.g., associated with a validity period) that includes the indication of the UDM group identifier and the UDR group identifier that are associated with the identifier of the UE.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a first network device and from a second network device, a subscription request to subscribe to receive an event notification based on an event, wherein the event occurs when the first network device receives a request for discovery of a unified data management (UDM) device, and wherein the request for discovery of the UDM device is based on an identifier of a user equipment (UE); and transmitting, by the first network device to the second network device and based on the subscription request, an indication of a subscription to receive the event notification based on the event, wherein the indication of the subscription confirms that the second network device is subscribed to receive the event notification based on the event.

2. The method of claim 1, further comprising:

transmitting, by the first network device and based on the subscription, an indication of the event notification, wherein the indication of the event notification includes an indication of at least one of:

a UDM group identifier associated with the UDM device, or a unified data repository (UDR) group identifier associated with a UDR device that is associated with the UDM device, and wherein the identifier of the UE is associated with the UDM group identifier and the UDR group identifier.

3. The method of claim 2, wherein transmitting, by the first network device, the indication of the event notification comprises:

transmitting the indication of the event notification to at least one of:

a policy control function (PCF) device, or a session management function (SMF) device.

4. The method of claim 1, further comprising:

transmitting, by the first network device and to a subscriber locator function (SLF) device, a request for a UDM group identifier and a unified data repository (UDR) group identifier associated with a UDR device that is associated with the UDM device; and receiving, by the first network device from the SLF device, the UDM group identifier and the UDR group identifier, wherein the identifier of the UE is associated with the UDM group identifier and the UDR group identifier.

5. The method of claim 1, wherein the event is associated with the first network device receiving the request for discovery of the UDM device from at least one of:

an authentication server function (AUSF) device request for discovery, or an access and mobility management function (AMF) device request for discovery.

6. The method of claim 1, wherein the second network device is at least one of a policy control function (PCF) device or a session management function (SMF) device.

7. A first network device, comprising:

one or more processors configured to:

transmit, to a second network device, a subscription request to subscribe to receive an event notification based on an event, wherein the event occurs when a request for discovery of a unified data management (UDM) device is received by the second network device, and wherein the request for discovery of the UDM device is based on an identifier of a user equipment (UE); and receive, from the second network device and based on the subscription request, an indication of a subscription to receive the event notification based on the event, wherein the indication of the subscription confirms that the first network device is subscribed to receive the event notification based on the event.

8. The first network device of claim 7, wherein the one or more processors are further configured to:

receive, based on the subscription, an indication of the event notification, wherein the indication of the event notification includes an indication of:

a UDM group identifier associated with the UDM device, and a unified data repository (UDR) group identifier associated with a UDR device that is associated with the UDM device, and wherein the identifier of the UE is associated with the UDM group identifier and the UDR group identifier.

9. The first network device of claim 8, wherein the one or more processors are further configured to:

receive a packet data unit (PDU) session establishment request;

query, using at least one of the UDM group identifier or the UDR group identifier and based on receiving the PDU session establishment request, at least one of the UDM device or the UDR device; and receive, based on querying the at least one of the UDM device or the UDR device, a user profile associated with the identifier of the UE.

10. The first network device of claim 8, wherein the UDM group identifier and the UDR group identifier are associated with a validity period.

11. The first network device of claim 7, wherein the second network device is a network repository function (NRF) device.

12. The first network device of claim 7, wherein the first network device is at least one of a policy control function (PCF) device or a session management function (SMF) device.

13. The first network device of claim 7, wherein the request for discovery a UDM device is based on a transmission from at least one of:

an authentication server function (AUSF) device request for discovery, or an access and mobility management function (AMF) device request for discovery.

14. The first network device of claim 7, wherein the one or more processors are further configured to:

receive, based on the subscription, an indication of the event notification, wherein the indication of the event notification is a discovery response that includes an indication of:

a UDM group identifier and a unified data repository (UDR) group identifier that are associated with the identifier of the UE, and a validity period associated with the discovery response.

15. A non-transitory computer-readable medium storing a set of instructions, the set of instructions comprising:

one or more instructions that, when executed by one or more processors of a first network device, cause the first network device to:

receive, from a second network device, a subscription request to subscribe to receive an event notification based on an event, wherein the event occurs when the first network device receives a request for discovery of a unified data management (UDM) device, and wherein the request for discovery of the UDM device is based on an identifier of a user equipment (UE); and transmit, to the second network device and based on the subscription request, an indication of a subscription to receive the event notification based on the event, wherein the indication of the subscription confirms that the second network device is subscribed to receive the event notification based on the event.

16. The non-transitory computer-readable medium of claim 15, wherein the one or more instructions, when executed by the one or more processors, further cause the first network device to:

transmit, based on the subscription, an indication of the event notification, wherein the indication of the event notification includes an indication of at least one of:

a UDM group identifier associated with the UDM device, or a unified data repository (UDR) group identifier associated with a UDR device that is associated with the UDM device, and wherein the identifier of the UE is associated with the UDM group identifier and the UDR group identifier.

17. The non-transitory computer-readable medium of claim 16, wherein the one or more instructions, that cause the first network device to transmit the indication of the event notification, cause the first network device to:

transmit the indication of the event notification to at least one of:

a policy control function (PCF) device, or a session management function (SMF) device.

18. The non-transitory computer-readable medium of claim 15, wherein the one or more instructions, when executed by the one or more processors, further cause the first network device to:

transmit, to a subscriber locator function (SLF) device, a request for a UDM group identifier and a unified data repository (UDR) group identifier associated with a UDR device that is associated with the UDM device; and receive, from the SLF device, the UDM group identifier and the UDR group identifier, wherein the identifier of the UE is associated with the UDM group identifier and the UDR group identifier.

19. The non-transitory computer-readable medium of claim 15, wherein the event is associated with the first network device receiving the request for discovery of the UDM device from at least one of:

an authentication server function (AUSF) device request for discovery, or an access and mobility management function (AMF) device request for discovery.

20. The non-transitory computer-readable medium of claim 15, wherein the second network device is at least one of:

a policy control function (PCF) device, or a session management function (SMF) device.

* * * * *